Nov. 9, 1965  H. M. SCISLOWICZ  3,216,418
APPARATUS FOR ADMINISTERING PARENTERAL SOLUTIONS
Filed June 1, 1962
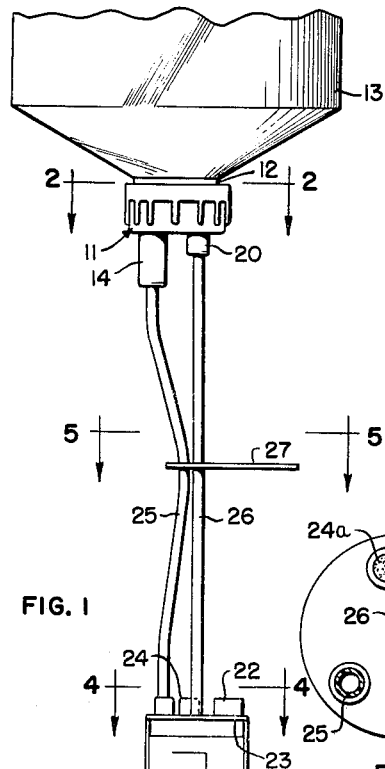
FIG. 1
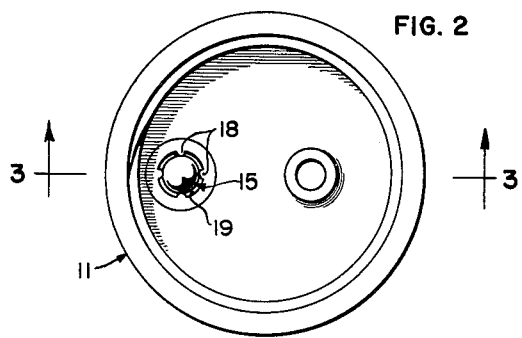
FIG. 2
FIG. 3
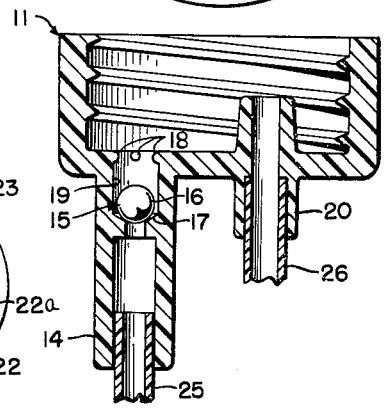
FIG. 4
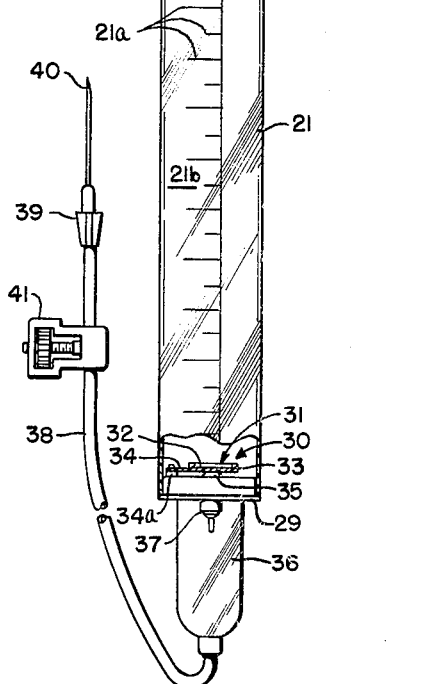
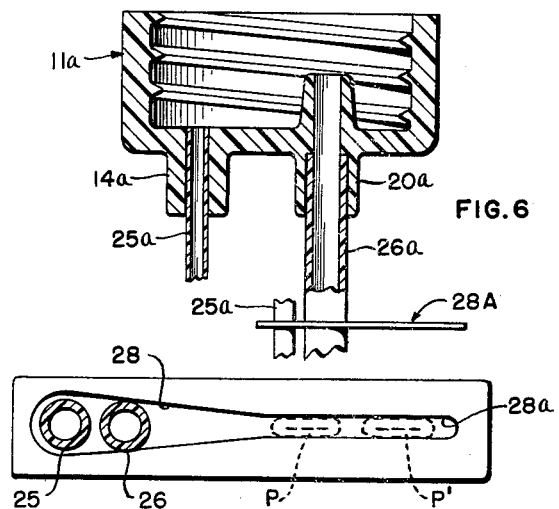
FIG. 6
FIG. 5
INVENTOR
HENRY M. SCISLOWICZ
BY Joseph J. Grass
ATTORNEY

United States Patent Office 3,216,418
Patented Nov. 9, 1965

3,216,418
APPARATUS FOR ADMINISTERING
PARENTERAL SOLUTIONS
Henry M. Scislowicz, Lake Bluff, Ill., assignor to Abbott Laboratories, North Chicago, Ill., a corporation of Illinois
Filed June 1, 1962, Ser. No. 199,436
3 Claims. (Cl. 128—214)

This invention relates to an apparatus for administering a liquid, and in particular it relates to an apparatus wherein a liquid such as a parenteral solution is transferred from a liquid container into a metering container.

It is one of the purposes of the invention to provide a construction for transferring a liquid, for example a parenteral solution, in a liquid container to a metering container by the employment of a pair of tubes. An air filter assembly is provided in the metering container so that after the solution passes from the liquid container into the metering container the solution is able to pass through a liquid outlet at the lower end of the metering container. It is preferred to provide means for interrupting flow through both the tubes.

It is one of the purposes of the invention to provide an apparatus which is simple in construction and safe and dependable in its operation. The apparatus of the invention insures both that a minimum amount of ambient air is employed in administering the solution while at the same time assuring that the metering container will drain properly. It is readily apparent, therefore, that the apparatus of the invention is fully suited to maintain the sterility of the parenteral solution.

In the diagrammatic drawing:

FIGURE 1 is a fragmentary side elevation view showing an apparatus for administering parenteral solutions;

FIGURE 2 is a cross-sectional view of a connector taken along line 2—2 of FIGURE 1;

FIGURE 3 is a cross-sectional view taken along line 3—3 of FIGURE 2;

FIGURE 4 is a cross-sectional view taken along line 4—4 of FIGURE 1;

FIGURE 5 is a cross-sectional view taken along line 5—5 of FIGURE 1 showing a pair of tubes in cross-section and a tubing clamp; and FIGURE 6 is a cross-sectional view showing one of the tubes as having a lesser diameter than the other of the tubes.

Referring now to FIGURES 1 and 3 of the illustrative drawing, there is shown an apparatus for administering parenteral solutions, generally indicated at 10. The apparatus 10 is shown to include a connector 11 which is shown to be received by an outlet end 12 of a rigid or semi-rigid liquid container 13 which is closed to ambient air. Although the connector 11 is shown to take the form of a threaded cap, it is of a character to be a plug which is received in the opening (not shown) of the outlet end 12. The connector 11 is shown to be provided with a fitment 14. The fitment 14 is shown to have a check valve generally indicated at 15 which is shown to include a ball 16 which is shown to be resting against a valve seat 17. Inwardly extending projections 18 limit the movement of the ball 16 in a tubular passage 19. Another fitment 20 is shown to be provided in the connector 11.

There is shown in FIGURE 1 of the illustrative drawing a metering container 21 having graduations 21a which extend longitudinally along a transparent container wall 21b. The metering container 21 is shown to be provided with an air filter assembly 22 which is shown to have a bacteria and liquid impervious and air pervious disk 22a of the same type as is disclosed in co-pending patent application Serial No. 158,372, filed December 11, 1961, now Patent 3,157,481. The air filter assembly 22 is shown to be suitably connected to an upper end wall 23 of the metering container 21. A reseal device 24 is shown to be provided at the upper end wall 23. The reseal device 24 includes a pierceable diaphragm 24a which is composed of a suitable material which can be pierced by the piercing cannula of a hypodermic syringe (not shown) and which will reseal when the cannula is withdrawn. Rubber is suitable for this purpose although other suitable materials are employable. By the employment of the reseal device 24, a medicament is able to be injected, by means for example of the hypodermic syringe, directly into the metering container 21. In this way the medicament, for example 5 cc. of vitamin B, can be mixed with the solution in the metering container 21 before the administration thereof. By way of example only, the volume of the metering container 21 is about 100 cc. Therefore it is apparent that a relatively small volume of medicament can be added and mixed with a relatively large volume of solution.

There are shown to be provided a pair of flexible tubes 25 and 26 which are secured at one end to the fitments 14 and 20 and at the other end to the end wall 23 of the metering container 21. The tubes 25 and 26 are preferably composed of a sterilizable material, for example polyvinyl chloride, rubber, or the like. A tubing clamp 27 having a gradually tapering tubing constricting slot 28 is provided. The tubes 25 and 26 are shown to be received in a gradually tapering tubing constricting slot 28 of the tubing clamp 27 as best shown in FIGURE 5 of the illustrative drawing.

The metering container 21 is shown to have a lower end wall 29. A valve generally indicated at 30 is shown to be provided in the metering container 21 at the place of the end wall 29. The valve 30 is shown to include a float 31 having a thin flexible diaphragm 32 and an annular form-retaining member 33. The valve 30 also includes a flexible hinge member 34 which hinges the float 31 for movement toward and away from a liquid outlet 35 which provides a valve seat. The hinge 34 is shown to be secured to a post 34a which extends from the end wall 29. The float 30 floats so long as there is liquid in the metering container 21 but seats against the valve seat in response to the substantial absence of liquid in the metering container 21 to prevent air from passing through the tubing 38 into the patient. A drip chamber 36 is disposed at the lower end of the metering container 21. The solution drips into the drip chamber 36 through a drip tube 37. A length of tubing 38 leads from the drip chamber 36 to a hypodermic needle 39 having a cannula 40. An adjustable tubing clamp 41 is shown to be provided along the tubing 38.

The check valve 15 is not required to be in the connector 11 as shown, but it can be located at any suitable location along the paths of fluid flow. In the event no check valve is provided and the resistance to flow through both tubes is equal, the liquid will hunt and select one of the tubes to flow through with a slight time lag taking place until the selection is made, and air will flow through the other of the tubes.

To use the apparatus 10 of the invention, the liquid container 13 is first connected to the connector 11 with both the tubes 25 and 26 preferably being completely clamped off by the tubing clamp 27 at a maximum restricted portion 28a as shown by the phantom lines P and P' in FIGURE 5 of the illustrative drawing. Then the tubing clamp 27 is moved so that the tubes 25 and 26 are in the position indicated by the solid lines in FIGURE 5 of the illustrative drawing. The check valve 15 prevents the solution from flowing through the tube 25, but since the tube 26 is unobstructed, liquid is free to flow through the tube 26 into the metering container 21. As the solution begins to flow through the tube 26 and into the metering container 21, air will flow from the metering container 21, through the tube 25, past the check valve 15, and into the liquid container 13 to displace the liquid. The ball 16 of the check valve 15 is free to rise in the passage 19 until it contacts the inwardly extending projections 18. There is enough clearance between the ball 16 and that portion of the passage 19 which lies between the inwardly extending projections 18 to enable air to flow freely into the liquid container 13 in the event that the ball 16 is not seated against the valve seat 17.

Referring now to the embodiment of FIGURE 6 of the illustrative drawing, there is shown a connector 11a having fitments 14a and 20a. Tubes 25a and 26a are secured to the fitments 14a and 20a, respectively, for example by solvent sealing. The tubes 25a and 26a lead to the metering container 21 as in the embodiment of FIGURES 1 through 5 of the illustrative drawing. Tube 25a is of lesser inside diameter than the tube 26a and hence the tube 25a is of lesser cross-sectional area than the tube 26a. The tube 25a therefore provides a greater inherent resistance to liquid flow than the tube 26a. A restriction along one of the paths of flow in the embodiment of FIGURES 1 through 5 is employable as an alternative instead of providing tubes of different cross-sectional areas, if desired. Since the solution in the liquid container 13 will take the path of lesser resistance, liquid flow into the metering container 21 is automatically established through the tube 26a. Since the tube 26a is an easy path through which liquid can flow into the metering container 21, the liquid will automatically select the tube 26a through which to flow and the air will be forced to pass from the metering container 21, through the tube 25a and into the liquid container 13. The tubes 25a and 26a are also provided with a tubing clamp 28A, similar to the tubing clamp 28, for completely clamping off both tubes 25a and 26a. Since the fitment 14a is not shown to be provided with the check valve, it is all the more evident that it is highly desirable to provide a tubing clamp which will interrupt flow through both the tubes 25a and 26a. Although preferably a single tubing clamp is employed to interrupt flow through the tubes 25 and 26, 25a and 26a, a separate tubing clamp (not shown) can be provided for each tube.

The above-described embodiments being exemplary only, it will be understood that modifications in form or detail can be made without departing from the spirit and scope of the invention. Accordingly, the invention is not to be considered as limited save as is consonant with the scope of the following claims.

What is claimed is:
1. In an apparatus for administration of parenteral fluids, a primary liquid container including means defining a first pair of closely-spaced ports, a secondary container having two ends and including vent means and closure means at one end defining a second pair of closely-spaced ports and means at the other end defining an exit port, a first length of flexible tubing having a proximal end in communication with said exit port and a distal end connected to an intravenous cannula, a second length of flexible tubing intercommunicating one of each of said first and second pairs of ports, and means including a third length of flexible tubing intercommunicating the other of each of said first and second pairs of ports providing a greater resistance to liquid flow from said primary container to said secondary container than is provided by said second length of tubing, whereby liquid flow from said primary container to said secondary container will occur through said second length of tubing and air flow from said secondary container to said primary container will occur through said third length of tubing.

2. In an apparatus for administration of parenteral fluids, a primary liquid container including means defining a first pair of closely-spaced ports, a secondary container having two ends and including vent means and closure means at one end defining a second pair of closely-spaced ports and means at the other end defining an exit port, a first length of flexible tubing having a proximal end in communication with said exit port and a distal end connected to an intravenous cannula, a second length of flexible tubing intercommunicating one of each of said first and second pairs of ports, and a third length of flexible tubing having a greater inner diameter than said second length of tubing and intercommunicating the other of each of said first and second pairs of ports whereby liquid flow from said primary to said secondary container will occur through said third length of tubing and air flow from said secondary to said primary container will occur through said second length of tubing.

3. In an apparatus for administration of parenteral fluids, a primary liquid container including means defining a first pair of closely-spaced ports, a valve seat operatively associated with one of said first ports, a check valve mounted in said valve seat, a secondary container having two ends and including vent means and closure means at one end defining a second pair of closely-spaced ports and means at the other end defining an exit port, a first length of flexible tubing having a proximal end in communication with said exit port and a distal end connected to an intravenous cannula, a second length of flexible tubing intercommunicating said port having a valve seat and one of said second pair of ports, and a third length of flexible tubing intercommunicating the other of each of said first and second pairs of ports, whereby liquid flow from said primary to said secondary container will occur through said third length of tubing and air flow from said secondary to said primary container will occur through said second length of tubing.

References Cited by the Examiner

UNITED STATES PATENTS

| | | | |
|---|---|---|---|
| 569,180 | 10/96 | Donally | 141—302 |
| 2,028,097 | 1/36 | Zafuta | 141—290 |
| 2,168,270 | 8/39 | Paisley | 128—214 |
| 2,757,670 | 8/56 | Ogle | 128—214 |
| 2,852,024 | 9/58 | Ryan | 128—214 |
| 2,907,325 | 10/59 | Burke | 128—214 |
| 3,049,918 | 8/62 | Sparkuhl | 128—214 |
| 3,050,061 | 8/62 | Goyke | 128—272 |
| 3,125,135 | 3/64 | Boyer et al. | 141—290 |

FOREIGN PATENTS 1,105,576   7/55   France.

RICHARD A. GAUDET, *Primary Examiner.*